United States Patent
Schultheis et al.

(10) Patent No.: US 6,629,330 B2
(45) Date of Patent: Oct. 7, 2003

(54) ARRANGEMENT FOR REMOVING RESIDUE FROM COOKING SPILLS FROM A HEATED OR COLD COOKING SURFACE

(75) Inventors: Bernd Schultheis, Schwabenheim (DE); Monica de Witzmann, Nieder-Olm (DE)

(73) Assignee: Schott Glas, Mainz (DE)

( * ) Notice: Subject to any disclaimer, the term of this patent is extended or adjusted under 35 U.S.C. 154(b) by 0 days.

(21) Appl. No.: 09/866,989

(22) Filed: May 29, 2001

(65) Prior Publication Data

US 2002/0017312 A1 Feb. 14, 2002

(30) Foreign Application Priority Data

May 30, 2000 (DE) .......................................... 100 26 824

(51) Int. Cl.⁷ .......................... A47L 13/08; B26B 27/00
(52) U.S. Cl. ............................ 15/236.01; 30/169; 134/6
(58) Field of Search ............................... 134/6, 19, 42; 15/236.01, 236.05; 30/169

(56) References Cited

U.S. PATENT DOCUMENTS 4,890,351 A * 1/1990 Wilson ................... 15/236.01
5,056,226 A    10/1991 Gringer
5,319,853 A *  6/1994 Schmidt .................... 30/169

FOREIGN PATENT DOCUMENTS

DE          4141593           8/1992

OTHER PUBLICATIONS

Schroter, W.: *Taschenbuch der Chemie* (= The Paperback of Chemistry) 10ᵗʰ Edition, 1983 Deutsch–Verlag (= publisher), Thun, Frankfurt/M., pp. 582–590.

* cited by examiner

*Primary Examiner*—Zeinab El-Arini
(74) *Attorney, Agent, or Firm*—Nils H. Ljungman & Associates

(57) ABSTRACT

An arrangement for removing residue from cooking spills from a heated or cold cooking surface. The arrangement includes a scraping device having a blade and a body, which body includes an ergonomically-shaped handgrip portion for a user to hold the scraping device. The user uses the blade to remove or scrape residue from the cooking surface, while minimizing damage to the cooking surface. The blade is held in a blade holder, which blade holder includes a moveable protection cover to protect the user from accidental contact with the blade. The cover can be retracted during use to expose the blade for removing residue. The blade holder and the handgrip portion are made of a duroplastic synthetic-plastic material having a low thermal conductivity.

6 Claims, 11 Drawing Sheets

ARRANGEMENT FOR REMOVING RESIDUE FROM COOKING SPILLS FROM A HEATED OR COLD COOKING SURFACE

BACKGROUND OF THE INVENTION

1. Field of the Invention

This invention relates to a method of treating a smooth-top kitchen ceramic or glass ceramic cooktop cooking surface of a smooth-top kitchen ceramic or glass ceramic cooktop or a stove having a ceramic or glass ceramic cooktop cooking surface, and a device therefor.

2. Background Information

Smooth-top kitchen ceramic or glass ceramic cooktop cooking surface of a smooth-top kitchen ceramic or glass ceramic cooktop or a stove having a ceramic or glass ceramic cooktop cooking surface have gained considerable popularity as kitchen appliances.

Thus, cooking appliances having ceramic or glass ceramic cooking surfaces are known.

They provide a substantially smooth upper surface on which can be disposed the various utensils that are to be heated.

In these appliances, the cooking zones can be heated, as a rule, by means of electrically operated or gas operated heating devices arranged below the ceramic or glass ceramic cooking surface in the region of the cooking zones. These devices can be, for example, electrically operated contact-heating or radiant heating elements or else gas-jet burners.

An example of a cooktop comprises an induction heating apparatus having a cooktop including a plurality of induction surface heating units. The cooktop comprises a horizontally disposed planar metal support surface having a plurality of openings therein. A ceramic smooth-top plate is supported in each of the openings and adapted to support a cooking utensil thereon. An induction heating coil is supported subjacent the ceramic plate in a position to generate a magnetic field which passes through the plate to link the cooking utensil. Each plate is supported by a metallic trim frame, which abuts a conductive layer on the plate, with the frame and layer combining to provide a low reluctance flux path, the low reluctance path operating to reduce the magnetic flux leaked into the space surrounding the heating apparatus during operation thereof.

Another example of a cooktop has a heating unit that includes two tubular tungsten-halogen lamps, each having a tungsten filament. The lamps are supported within a ring of ceramic fibre material and the unit is preferably mounted beneath an infra-red-transmissive cooktop to define a hot-plate area of a cooking hob. A control circuit provides a range of discrete power outputs of the lamps, each power output corresponding to a power control setting set by a user of the cooking hob. The circuit includes a phase control circuit for switching power to the lamps at a predetermined phase angle to achieve one or more of the lower power outputs.

Yet another example of a cooktop comprises a burner for a "sealed top" range which has a generally upwardly diverging conical body with radially disposed fuel ports and a generally flat removable cap disposed on the upper periphery of the body.

Cooking leaves spills or residues at times which need to be removed.

Cleaning a smooth-top kitchen ceramic or glass ceramic cooktop cooking surface of a smooth-top kitchen ceramic or glass ceramic cooktop or a stove having a ceramic or glass ceramic cooktop cooking surface is then a difficult task at times.

It has hitherto been suggested to clean the cooking surface of a smooth-top kitchen ceramic or glass ceramic cooktop or a stove comprising a smooth-top cooktop with a source of heat disposed below said cooking surface to pass heat through said smooth-top kitchen ceramic or glass ceramic cooking surface of said smooth-top kitchen ceramic or glass ceramic cooktop or stove having a ceramic or glass ceramic cooktop cooking surface with a cleaning agent for removing residue from a warm or cold smooth-top kitchen ceramic or glass ceramic cooktop cooking surface of a smooth-top kitchen ceramic or glass ceramic cooktop or a stove having a ceramic or glass ceramic cooktop cooking surface on its cooking surface.

However, such cleaning endeavor is at best able to only remove easy-to-clean residues that are readily removed by rubbing a cloth saturated with a cleaning agent or which wipes the cleaning agent across the smooth-top cooking surface.

Thus, in accordance with one aspect, the invention relates to a cleaning device or scraper which is configured with a handgrip portion and a working portion for receiving thereat a blade and which cleaning scraper resists temperatures above one hundred and thirty degrees Celsius, particularly two hundred and forty degrees Celsius and higher, and is withstanding a glass surface or glass-like surface.

Under the trademark "CERA-Quick" of the assignee of the present invention, there are known cleaning scrapers for glass ceramic cooktops. The known cleaning scrapers are made of metal. The metallic handgrip portion is short and in parts thereof is configured with sharp edges. This cleaning scraper provides the advantage that it can be left unintentionally on a hot glass ceramic plate without the scraper leaving temperature-dependent residues on the glass ceramic plate of the cooking stove. It is, however, of detriment that the scraper becomes very hot due to the conductivity of the metal, such that the user is possibly burned when lifting the hot scraper. Furthermore, there arises the danger of burning due to the relatively short handle when cleaning the hot surface with the scraper.

There are also known on the market cleaning scrapers which are made of thermoplastic synthetic-plastic material. When such scrapers are unintentionally left on a hot glass ceramic plate, they tend to melt, which leads to a damage of the glass ceramic surface which is to be cleaned. At the surface there can arise during cooling so-called "conchiforms," or conchoidal formations (German term: Ausmuschelungen).

In Federal Republic of Germany Patent Application Publication DE 41 41 593 A1, corresponding, inter alia, to U.S. Pat. No. 5,056,226, issued to Gringer on Oct. 15, 1991 and entitled, "Tool for Carrying a Scraping or Stripping Blade," there is described the configuration of a cleaning scraper. This scraper is intended for use on cold surfaces. The scraper is comprised of an elastic synthetic-plastic material which is of little or no use for an application on hot surfaces, particularly glass ceramic cooktops.

The literature also comprises Schröbter, W., "Taschenbuch der Chemie [Pocketbook of Chemistry]," 10th edition, 1983, Deutsch-Verlag, Thun, Frankfurt/Main, pages 582 to 590, which describe that duroplastic materials disintegrate without prior softening and that they are insoluble or inert. Therein reference is also made that melamine is useable up to a temperature of one hundred and thirty degrees Celsius.

Glass ceramic smooth-top cooking surfaces are typically manufactured by rolling Li—Al—Si glass ("green glass"), which is then ceramized.

It is the object of the present invention to propose a cleaning method and a device therefor of the type introduced in the foregoing which scraper, on contact with a hot surface, does not leave residues and particularly in the case of glass ceramic cooktops does not lead to a damage of the surface thereof, which scraper itself is not subjected to damage, and which method scraper can readily be used in a convenient manner also on hot surfaces.

SUMMARY OF THE INVENTION

In accordance with one aspect of the invention there is provided a method of use with a smooth-top kitchen ceramic or glass ceramic cooktop cooking surface of a smooth-top kitchen ceramic or glass ceramic cooktop or a stove having a ceramic or glass ceramic cooktop cooking surface on its cooking surface for removing residue from cooking spills and the like from a smooth-top kitchen ceramic or glass ceramic cooktop cooking surface of a smooth-top kitchen ceramic or glass ceramic cooktop or a stove having a ceramic or glass ceramic cooktop cooking surface on its cooking surface with a device for removing residue from cooking spills and the like from a heated or cold smooth-top kitchen ceramic or glass ceramic cooktop cooking surface of a smooth-top kitchen ceramic or glass ceramic cooktop or a stove having a ceramic or glass ceramic cooktop cooking surface on its cooking surface, said method comprising the steps of: moving said device for removing residue from cooking spills and the like from a heated or cold smooth-top kitchen ceramic or glass ceramic cooktop cooking surface of a kitchen ceramic or glass ceramic cooktop or a stove having a ceramic or glass ceramic cooktop cooking surface on its cooking surface across a heated or cold cooking surface; removing residue from cooking spills and the like from said heated cooking surface with said device for removing residue from cooking spills and the like residues from a heated or cold smooth-top kitchen ceramic or glass ceramic cooktop cooking surface of a smooth-top kitchen ceramic or glass ceramic cooktop or a stove having a ceramic or glass ceramic cooktop cooking surface on its cooking surface; said device for removing residue from cooking spills and the like from a heated or cold smooth-top kitchen ceramic or glass ceramic cooktop cooking surface of a smooth-top kitchen ceramic or glass ceramic cooktop or a stove having a ceramic or glass ceramic cooktop cooking surface on its cooking surface comprising a portion configured to minimize damage to said smooth-top kitchen ceramic or glass ceramic cooktop cooking surface of said smooth-top kitchen ceramic or glass ceramic cooktop or said stove having a ceramic or glass ceramic cooktop cooking surface on its cooking surface when said smooth-top kitchen ceramic or glass ceramic cooktop cooking surface of a smooth-top kitchen ceramic or glass ceramic cooktop or a stove having a ceramic or glass ceramic cooktop cooking surface on its cooking surface is either heated or cold; said portion being configured with sufficient stiffness and rigidity to maintain its structural shape for removing residue from cooking spills and the like from a heated or cold smooth-top kitchen ceramic or glass ceramic cooktop cooking surface of a smooth-top kitchen ceramic or glass ceramic cooktop or a stove having a ceramic or glass ceramic cooktop cooking surface on its cooking surface on being pressed to either a heated or cold smooth-top kitchen ceramic or glass ceramic cooktop cooking surface of a smooth-top kitchen ceramic or glass ceramic cooktop or a stove having a ceramic or glass ceramic cooktop cooking surface on its cooking surface when heated or cold to remove residue from cooking spills and the like from said smooth-top kitchen ceramic or glass ceramic cooktop cooking surface of said smooth-top kitchen ceramic or glass ceramic cooktop or a stove having a ceramic or glass ceramic cooktop cooking surface on its cooking surface; said portion being configured to withstand use on a heated smooth-top kitchen ceramic or glass ceramic cooktop cooking surface of a smooth-top kitchen ceramic or glass ceramic cooktop or a stove having a ceramic or glass ceramic cooktop cooking surface on its cooking surface; said portion of said device holding a residue removing part to remove residue from said hot cooking surface; said residue removing part being held by said portion of said device; said portion of said device comprising a material of construction having a thermal conductivity being sufficiently low to minimize heat conduction between said residue removing part and said portion holding said residue removing part; and also having a thermal conductivity to minimize heat being conducted along said portion upon said residue removing part making contact with a hot smooth-top kitchen ceramic or glass ceramic cooktop cooking surface of said smooth-top kitchen ceramic or glass ceramic cooktop or a stove having a ceramic or glass ceramic cooktop cooking surface on its cooking surface; in said method: said moving of said device across said heated smooth-top kitchen ceramic or glass ceramic cooktop cooking surface of said smooth-top kitchen ceramic or glass ceramic cooktop or a stove having a ceramic or glass ceramic cooktop cooking surface on its cooking surface comprising: maintaining, when said a smooth-top kitchen ceramic or glass ceramic cooktop cooking surface of a smooth-top kitchen ceramic or glass ceramic cooktop or a stove having a ceramic or glass ceramic cooktop cooking surface on its cooking surface is heated, said sufficient stiffness and rigidity upon removing residue from cooking spills and the like from said smooth-top kitchen ceramic or glass ceramic cooktop cooking surface of said smooth-top kitchen ceramic or glass ceramic cooktop or a stove having a ceramic or glass ceramic cooktop cooking surface on its cooking surface.

In accordance with a further aspect of the invention there is provided an arrangement for performing a method of use with and being configured for use with a smooth-top kitchen ceramic or glass ceramic cooktop cooking surface of a smooth-top kitchen ceramic or glass ceramic cooktop or a stove having a ceramic or glass ceramic cooktop cooking surface on its cooking surface, said arrangement comprising an arrangement for removing residue from cooking spills and the like from a smooth-top kitchen ceramic or glass ceramic cooktop cooking surface of a smooth-top kitchen ceramic or glass ceramic cooktop or a stove having a ceramic or glass ceramic cooktop cooking surface on its cooking surface for removing residue from cooking spills and the like from a heated or cold smooth-top kitchen ceramic or glass ceramic cooktop cooking surface of a smooth-top kitchen ceramic or glass ceramic cooktop or a stove having a ceramic or glass ceramic cooktop cooking surface on its cooking surface, said method of use comprising the steps of: moving said arrangement for removing residue from cooking spills and the like from a heated or cold smooth-top kitchen ceramic or glass ceramic cooktop cooking surface of a kitchen ceramic or glass ceramic cooktop or a stove having a ceramic or glass ceramic cooktop cooking surface on its cooking surface across a heated or cold cooking surface; removing residue from cooking spills and the like with said arrangement for removing residue from cooking spills and the like from a heated or cold smooth-top kitchen ceramic or glass ceramic cooktop cooking surface of a smooth-top kitchen ceramic or glass ceramic cooktop or a stove having a ceramic or glass ceramic cooktop cooking surface on its cooking surface; said arrangement comprising: a device for removing residue from cooking spills and the like from a heated or cold smooth-top kitchen ceramic or glass ceramic cooktop cooking surface of a smooth-top kitchen ceramic or glass ceramic cooktop or a stove having a ceramic or glass ceramic cooktop cooking surface on its cooking surface comprising a portion configured to minimize damage to said smooth-top kitchen ceramic or glass ceramic cooktop cooking surface of said smooth-top kitchen ceramic or glass ceramic cooktop or said stove having a ceramic or glass ceramic cooktop cooking surface on its cooking surface when said smooth-top kitchen ceramic or glass ceramic cooktop cooking surface of a smooth-top kitchen ceramic or glass ceramic cooktop or a stove having a ceramic or glass ceramic cooktop cooking surface on its cooking surface is either heated or cold; said portion being configured with sufficient stiffness and rigidity to maintain its structural shape for removing residue from cooking spills and the like from a heated or cold smooth-top kitchen ceramic or glass ceramic cooktop cooking surface of a smooth-top kitchen ceramic or glass ceramic cooktop or a stove having a ceramic or glass ceramic cooktop cooking surface on its cooking surface on being pressed to either a heated or cold smooth-top kitchen ceramic or glass ceramic cooktop cooking surface of a smooth-top kitchen ceramic or glass ceramic cooktop or a stove having a ceramic or glass ceramic cooktop cooking surface on its cooking surface when heated or cold to remove residue from cooking spills and the like from said smooth-top kitchen ceramic or glass ceramic cooktop cooking surface of said smooth-top kitchen ceramic or glass ceramic cooktop or a stove having a ceramic or glass ceramic cooktop cooking surface on its cooking surface; said portion being configured to withstand use on a heated smooth-top kitchen ceramic or glass ceramic cooktop cooking surface of a smooth-top kitchen ceramic or glass ceramic cooktop or a stove having a ceramic or glass ceramic cooktop cooking surface on its cooking surface; said portion of said device holding a residue removing part to remove residue from said hot cooking surface; said residue removing part being held by said portion of said device; said portion of said device comprising a material of construction having a thermal conductivity being sufficiently low to minimize heat conduction between said residue removing part and said portion holding said residue removing part; and also having a thermal conductivity to minimize heat being conducted along said portion upon said residue removing part making contact with a hot smooth-top kitchen ceramic or glass ceramic cooktop cooking surface of said smooth-top kitchen ceramic or glass ceramic cooktop or a stove having a ceramic or glass ceramic cooktop cooking surface on its cooking surface; in said method: said moving of said device across said heated or cold smooth-top kitchen ceramic or glass ceramic cooktop cooking surface of said smooth-top kitchen ceramic or glass ceramic cooktop or a stove having a ceramic or glass ceramic cooktop cooking surface on its cooking surface comprising: maintaining, when said a smooth-top kitchen ceramic or glass ceramic cooktop cooking surface of a smooth-top kitchen ceramic or glass ceramic cooktop or a stove having a ceramic or glass ceramic cooktop cooking surface on its cooking surface is heated, said sufficient stiffness and rigidity upon removing residue from cooking spills and the like from said smooth-top kitchen ceramic or glass ceramic cooktop cooking surface of said smooth-top kitchen ceramic or glass ceramic cooktop or a stove having a ceramic or glass ceramic cooktop cooking surface on its cooking surface.

The invention teaches, in accordance with at least one embodiment, that the foregoing object can be accomplished by a scraper in which the handgrip portion and the working portion are formed of a duroplastic synthetic-plastic material.

This cleaning scraper can be economically produced, for example, by a flow-press method. In other words, in at least one embodiment of the invention, the manufacture of the scraper can be carried out by an impact injection method. In other words, furthermore, in at least one embodiment of the invention, the manufacture of the scraper can be carried out by an extrusion method or the like molding method. The handle portion can be configured in an ergonomically favorable manner and the stability can be increased by stiffening ribs.

Duroplastic synthetic-plastic materials can comprise melamine resins or unsaturated polyester resins. Experimentation has shown that the scraper is not damaged even when being subjected to be in contact with a glass ceramic cooking surface having a temperature of from about five hundred degrees Celsius to six hundred degrees Celsius; and it does not damage this surface in terms of conchiforms or chemical attack. Due to the high thermal stability of the duroplastic synthetic-plastic material, the scraper does not leave residues on the hot cooking surface.

The cleaning scraper can be conveniently handled, due to a lower heat conductivity when compared to metal, also on hot surfaces, since it does not become too hot.

The cleaning scraper can be used to clean grill or cooking surfaces made of glass ceramic, glass ceramic fireplace view windows, stove-sight-screens made of glass, glass surfaces of windows, doors and pieces of furniture, and in case of ceramic surfaces such as heating plates and tiles.

Further advantageous embodiments of the invention are contained in the dependent claims and the following description.

The above-discussed embodiments of the present invention will be described further herein below. When the word "invention" is used in this specification, the word "invention" includes "inventions", that is, the plural of "invention". By stating "invention", the Applicants do not in any way admit that the present application does not include more than one patentably and non-obviously distinct invention, and maintains that this application may include more than one patentably and non-obviously distinct invention. The Applicants hereby assert that the disclosure of this application may include more than one invention, and, in the event that there is more than one invention, that these inventions may be patentable and non-obvious one with respect to the other.

BRIEF DESCRIPTION OF THE DRAWINGS

The invention is explained in greater detail below with reference to the accompanying drawings, wherein.

DESCRIPTION OF THE PREFERRED EMBODIMENT

Figure 1:
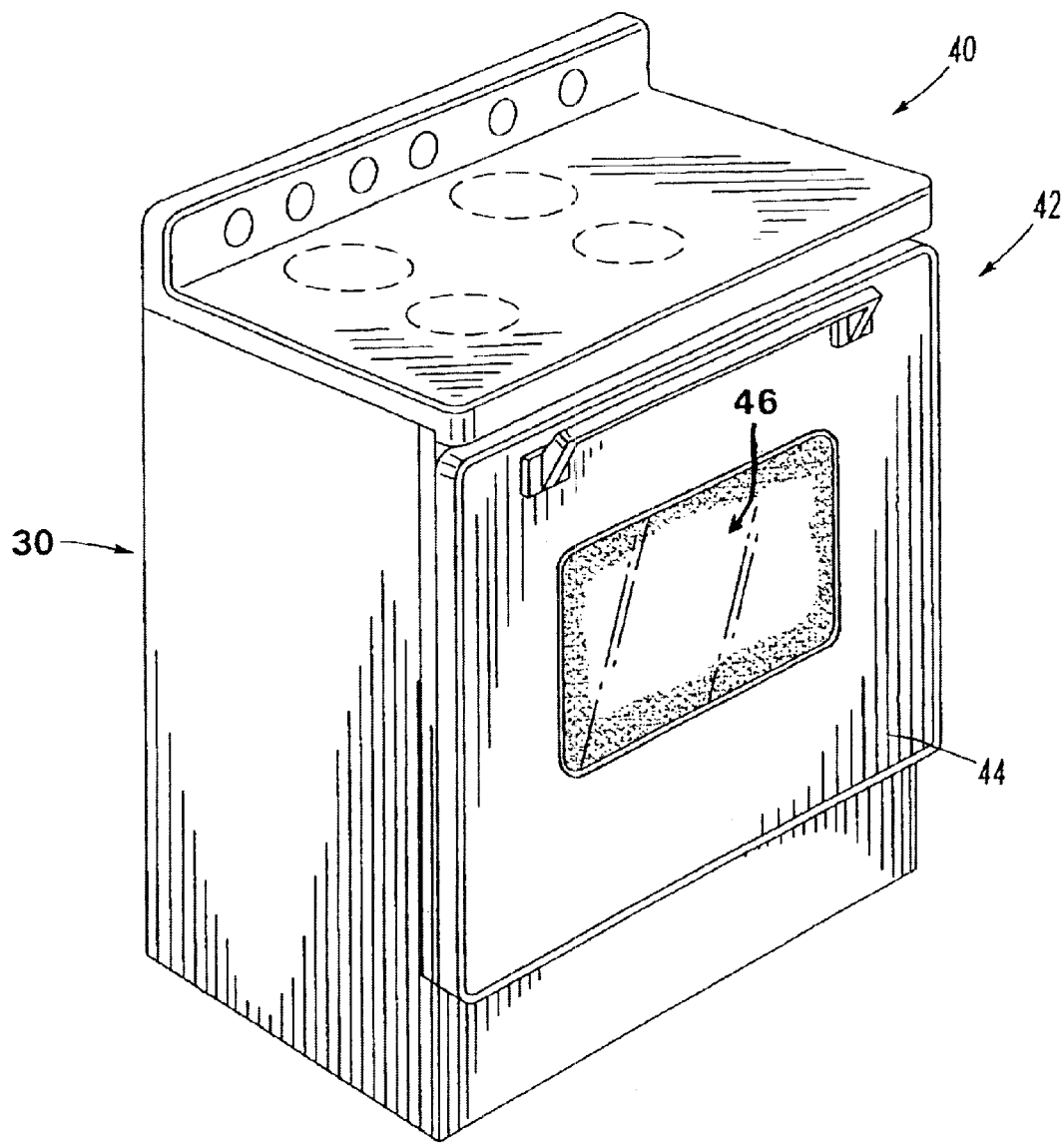
FIG. 1: is a perspective view of a stove with a cooktop and oven.

FIG. 1 of the embodiment example shows a stove 30 for cooking food with a cooktop 40 and an oven 42. The oven door 44 has a window 46. Both the cooktop 40 and the window 46 of the oven door 42 can have, for example, relatively easy-to-clean glass ceramic surfaces.

Figure 2:
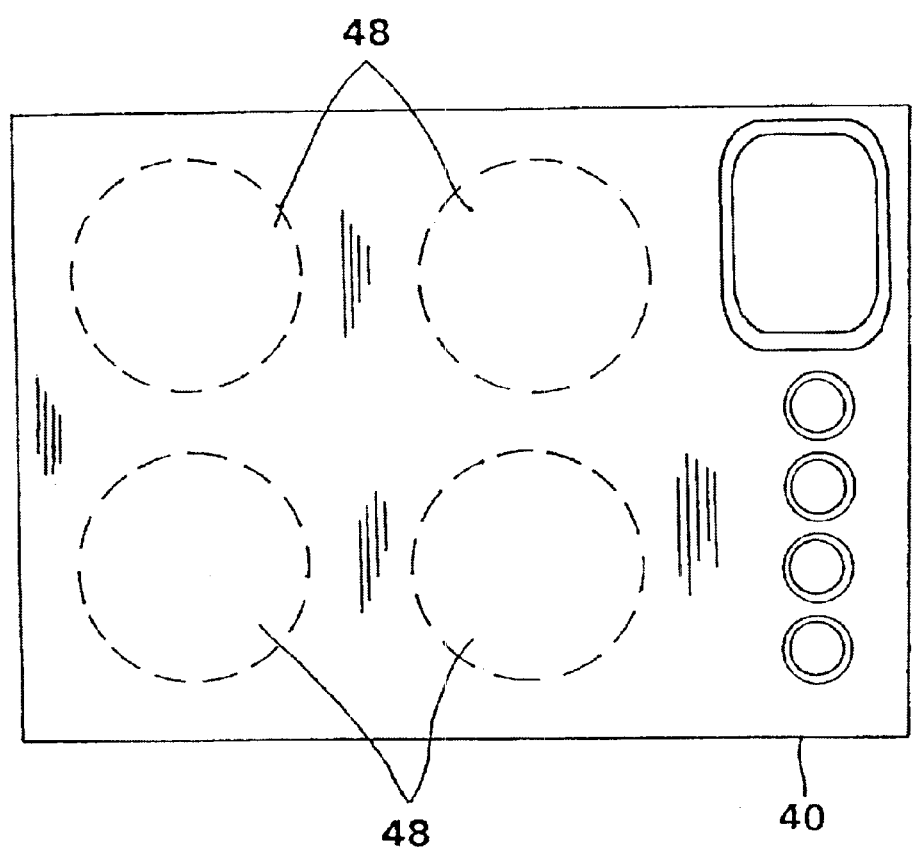
FIG. 2: is a top view of a cooktop or hob with multiple cooking zones.

FIG. 2 illustrates a cooktop or hob for cooking food 40 with cooking zones 48. The cooktop 40 has, for example, an easy-to-clean glass ceramic surface.

Figure 3:
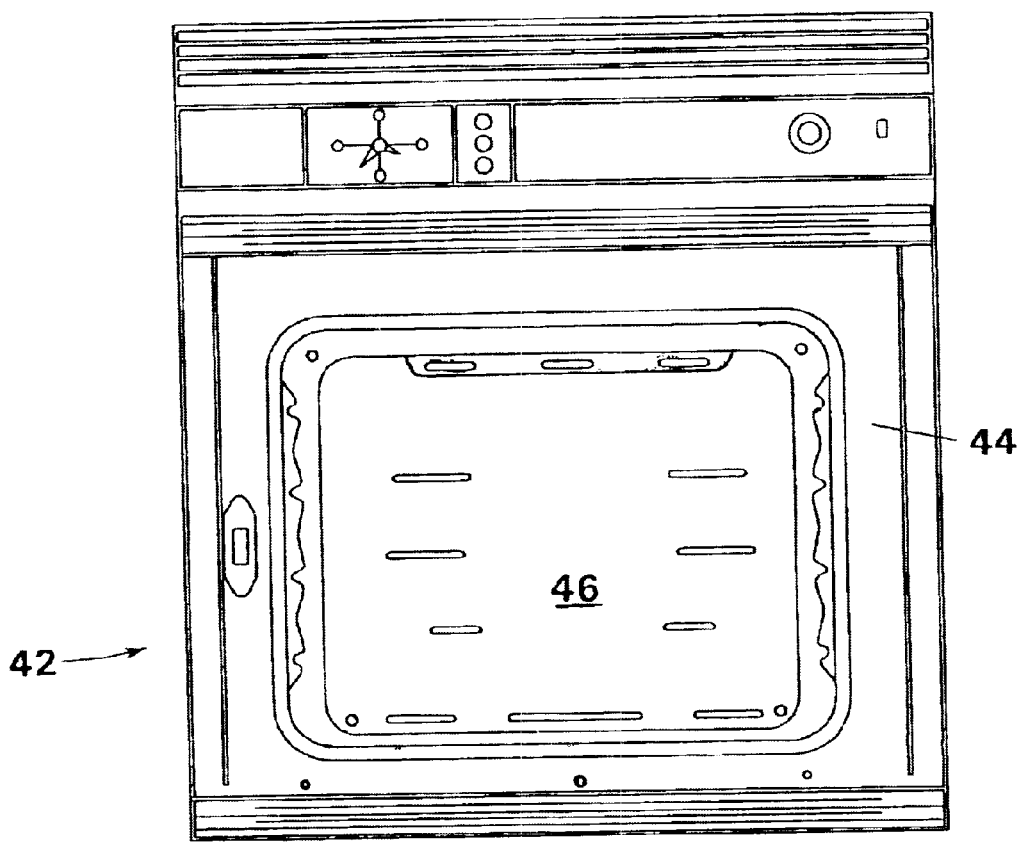
FIG. 3: is a front elevational view of a free-standing oven with an oven door window.

FIG. 3 shows a free-standing oven for cooking food 42 with an oven door 44. The oven door 44 has a window 46 with, for example, an easy-to-clean glass ceramic surface.

Figure 4:
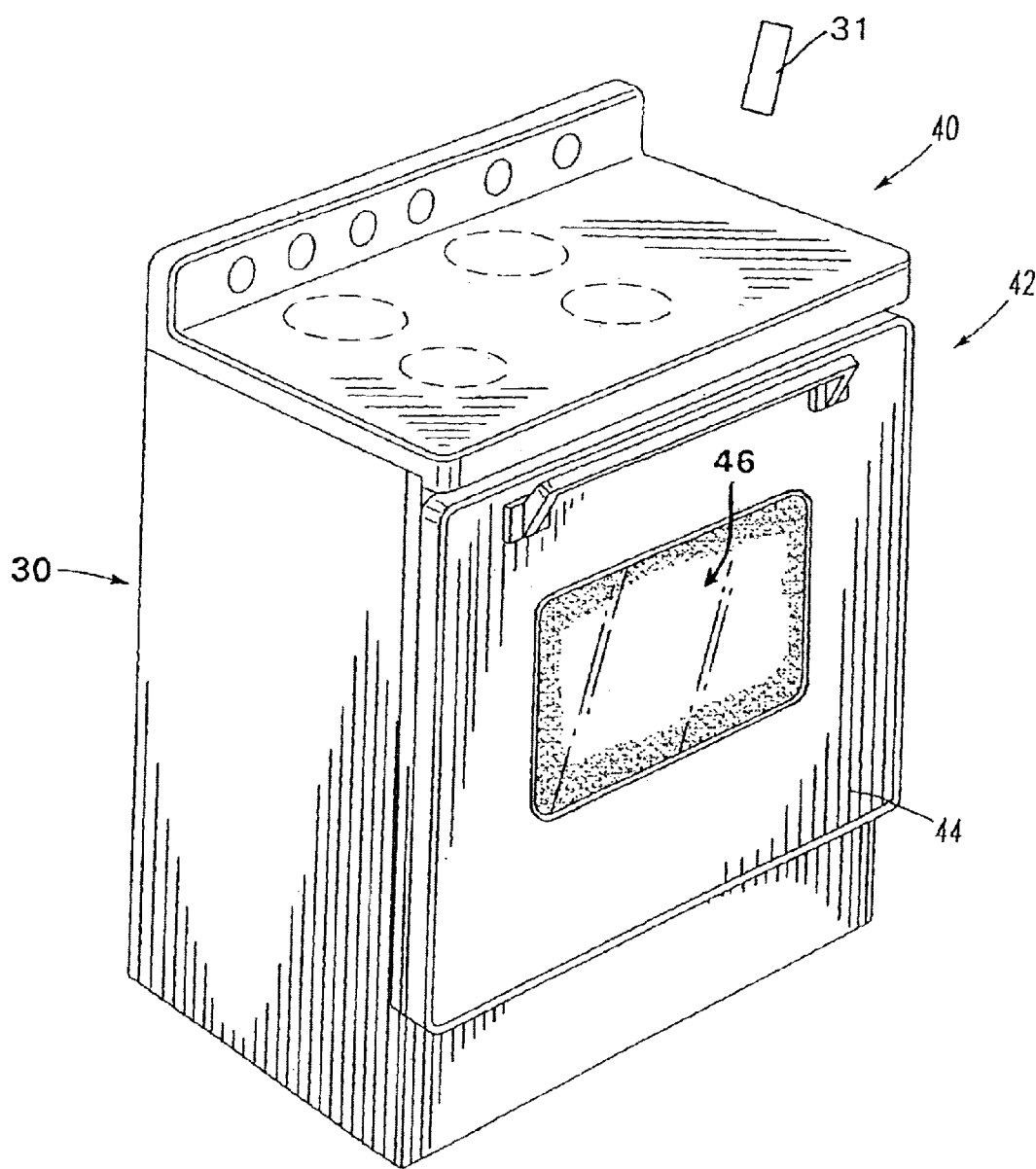
FIG. 4: is a perspective view of a stove with a cooktop and oven and a cleaning scraper which is shown schematically.

FIG. 4 of the embodiment example shows a stove 30 for cooking food with a cooktop 40 and an oven 42. The oven door 44 has a window 46. Both the cooktop 40 and the window 46 of the oven door 42 can have, for example, relatively easy-to-clean glass ceramic surfaces. There is also schematically shown a cleaning device 31 for removing residue from the cooktop 40 in accordance with one aspect of the present invention.

Figure 5:
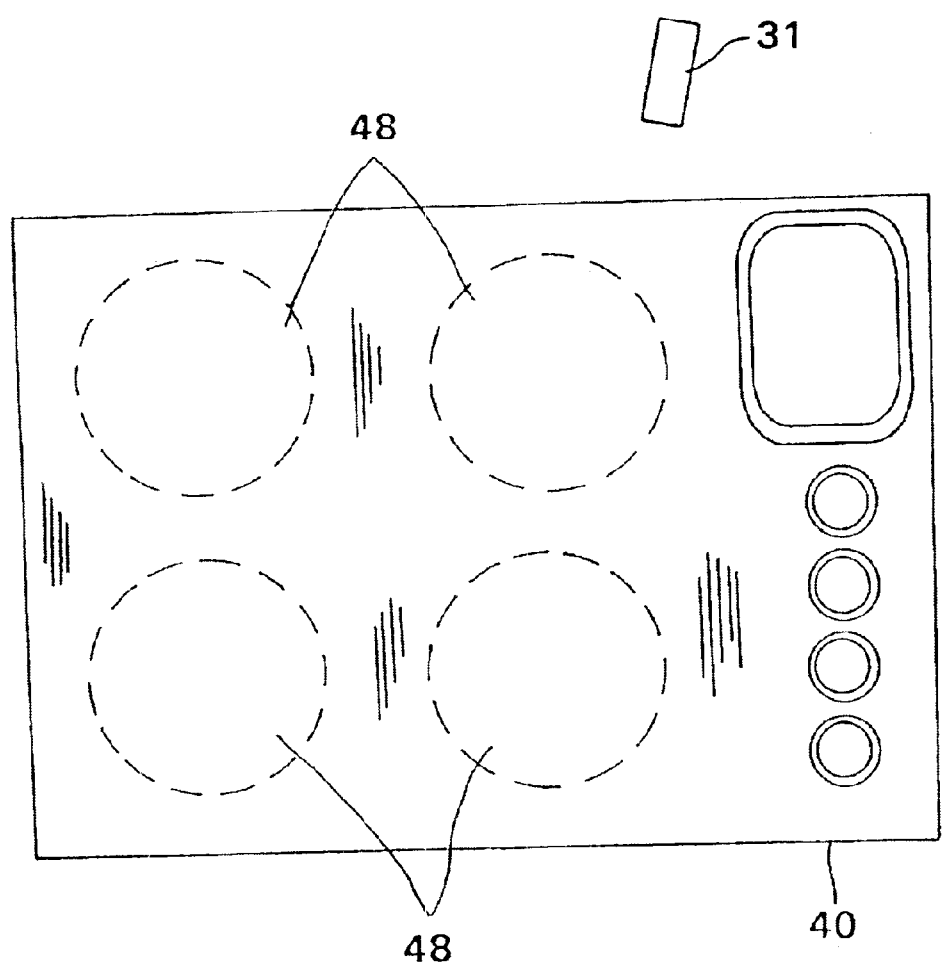
FIG. 5: is a top view of a cooktop or hob with multiple cooking zones and a cleaning scraper which is shown schematically.

FIG. 5 illustrates a cooktop or hob for cooking food 40 with cooking zones 48. The cooktop 40 has, for example, an easy-to-clean glass ceramic surface. There is also schematically shown a cleaning device 31 in accordance with a further aspect of the present invention.

Figure 6:
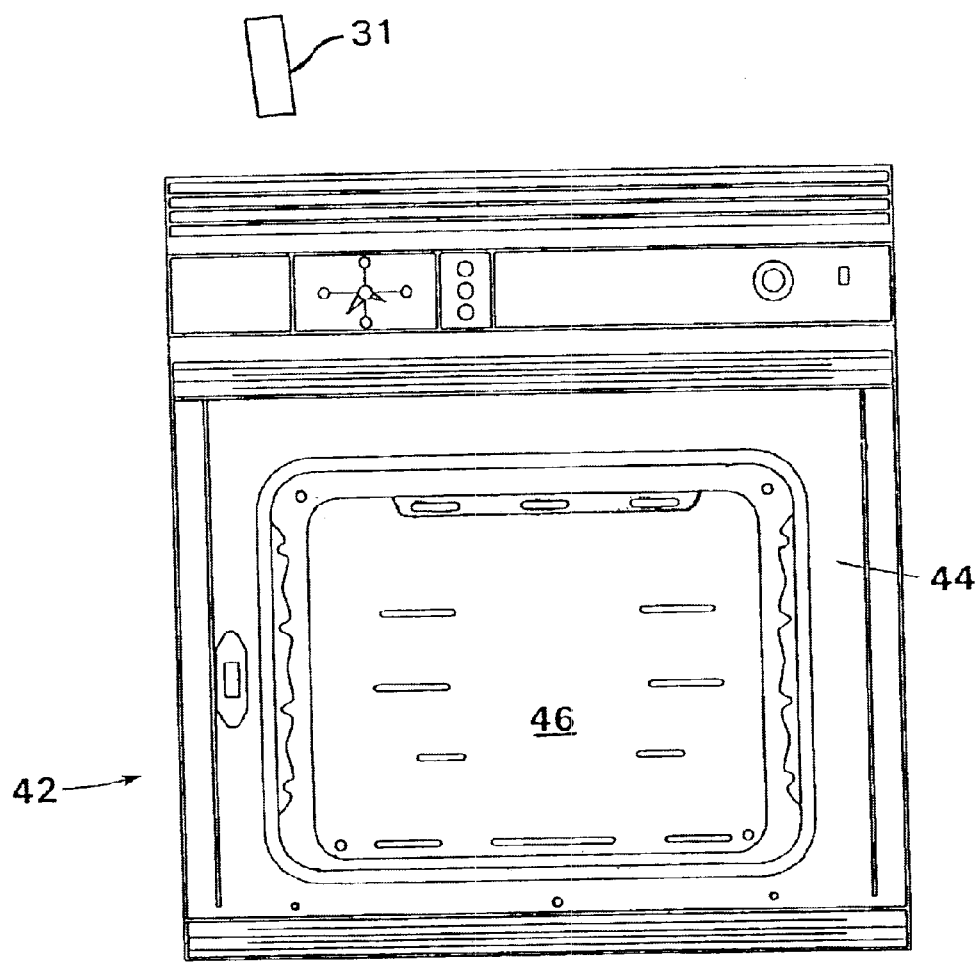
FIG. 6: is a front elevational view of a free-standing oven with an oven door window and a cleaning scraper which is shown schematically.

FIG. 6 shows a free-standing oven for cooking food 42 with an oven door 44. The oven door 44 has a window 46 with, for example, an easy-to-clean glass ceramic surface. There is also schematically shown a cleaning device 31 in accordance with yet another aspect of the invention.

Figure 7:
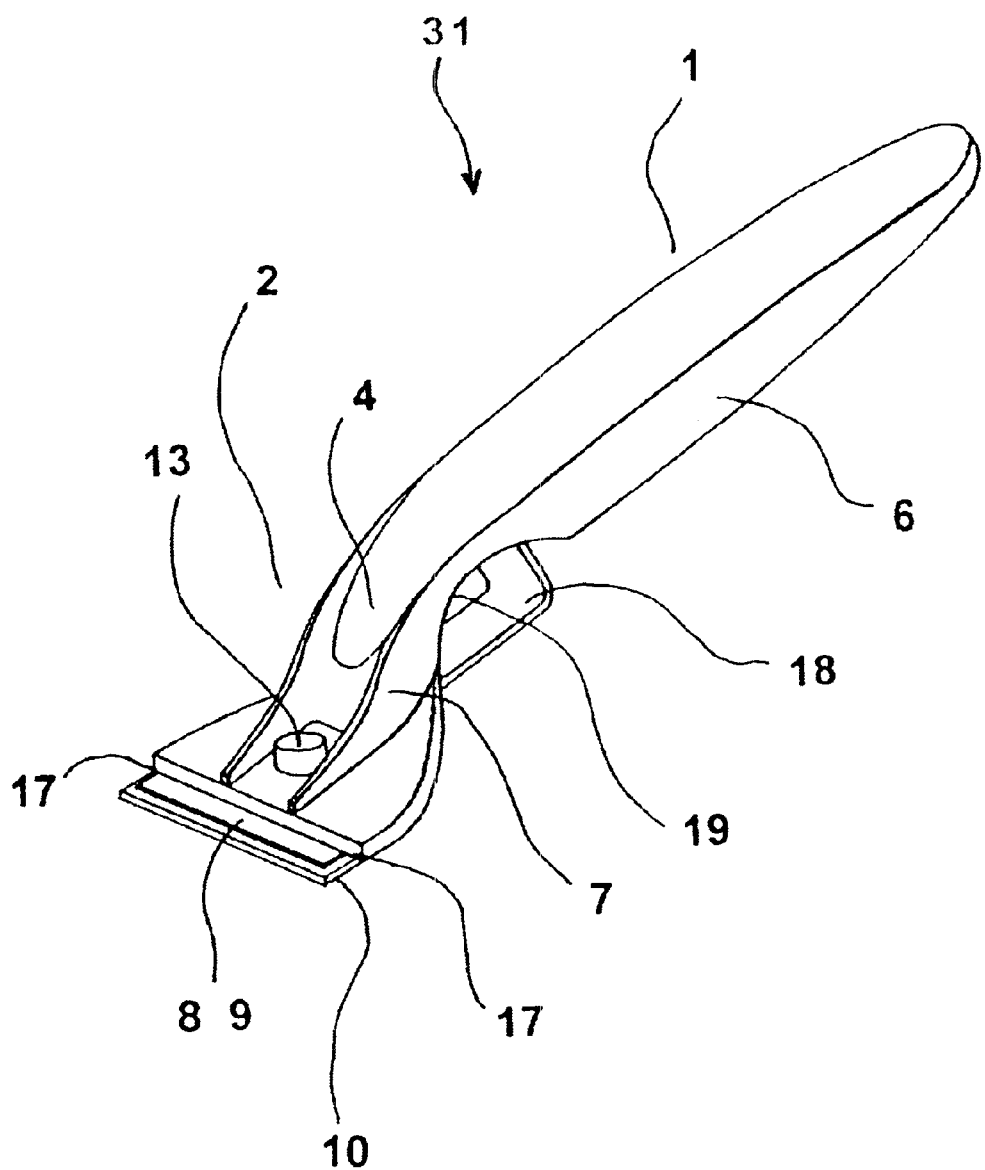
FIG. 7: shows a cleaning scraper in a perspective view.

Referring to FIG. 7, the cleaning scraper 31 has a handgrip portion 1 and a working portion 2. The two portions 1 and 2 are unitary and formed of a temperature resistant duroplastic synthetic-plastic material. The duroplastic synthetic-plastic material can comprise a melamine resin or an unsaturated polyester resin which may be glass fiber reinforced to enhance the mechanical strength. The manufacture is carried out using a flow-press method. In other words, in at least one embodiment of the invention, the manufacture of the scraper can be carried out by an impact injection method. In other words, furthermore, in at least one embodiment of the invention, the manufacture of the scraper can be carried out by an extrusion method or the like molding method.

In order to investigate the suitability of the duroplastic synthetic-plastic material in conjunction with a glass ceramic plate, the following experiments were carried out on a glass ceramic plate of the type known under the trademark of SCHOTT GLAS as "CERAN".

1st Experiment

The glass ceramic plate was heated to various cooking temperatures based on relevant practical temperatures and two pieces of duroplastic synthetic-plastic material were placed on the plate for about twenty-five minutes so as to simulate whether—in the event of the scraper being left unintentionally in the heating area—a damage of the glass ceramic cooking plate would arise. No incidence of a chemical attack of the glass ceramic plate was noted.

2nd Experiment

The glass ceramic plate was heated to a surface temperature of two hundred and forty degrees Celsius, three spoons of sugar were added and the caramelized mass was stirred for approximately ten minutes with duroplastic synthetic-plastic parts. Again, also in this experiment, surprisingly, no damage of the glass ceramic plate was observed. The synthetic-plastic parts could easily be cleaned subsequently.

Following the experiments the synthetic-plastic parts were slightly burned, however, they did not leave any damage or, respectively, residues on the glass ceramic plate.

The handgrip portion 1 is made of duroplastic synthetic-plastic material in such an ergonomic configuration that is can rest securely and comfortably in the hand of a user (compare FIG. 7). By means of an S-shaped transition portion 3 between the handgrip portion 1 and the working portion 2 at the working portion 2 there is attained a thumb-receiving surface 4 for the hand of a user which embraces the handgrip portion 1. The thumb-receiving surface 4 ensures that the user can impart a sufficient pressure for scraping upon the working portion 2. In other words, the handgrip portion 1 of the arrangement to remove residues from cooking spills is configured to be comfortably held by the hand of a user.

Figure 8:
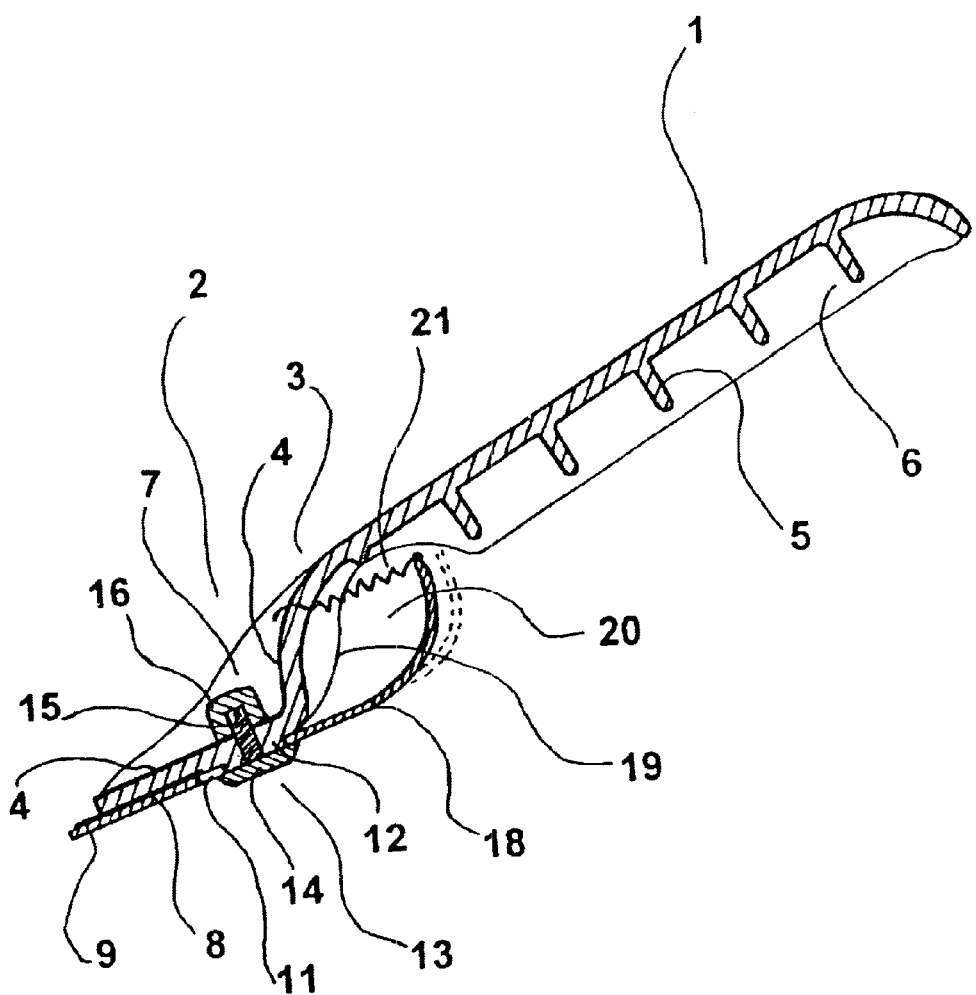
FIG. 8: is a cross-section of the cleaning scraper of FIG. 7.

For the purpose of stiffening, in the handgrip portion 1 there are provided stiffening ribs 5 which face away from the upper side 1' of the handgrip portion 1. The stiffening ribs 5 extend between the lateral strips or side walls 6 of the handgrip portion 1. Further stiffening ribs 7 are contemplated in the embodiment according to FIGS. 7 and 8 so as to stabilize the working portion 2 with respect to the handgrip portion 1. Between the stiffening ribs 7 there is provided the thumb-receiving surface 4.

The working portion 2 is configured in such a way that a metal blade 8, for example, a customary razor blade, can replaceably be secured to it. The working portion 2 has for this purpose corresponding recesses or projections. In other words, the working portion 2 comprises a blade holder in one embodiment of the present invention.

The blade 8 projects with its cutting edge 9 beyond the working portion 2. So as to cover, for purposes of safety, the cutting edge 9 when the scarper is not being used, in the embodiment in accordance with FIGS. 7 and 8 there is contemplated a moveable protection cover 10. The protection cover 10 can be made of metal or also of a duroplastic synthetic-plastic. The protection cover 10 is guided by at least one longitudinal slot 11 that is being guided at one or several prongs or prong-like projecting formations 12 so as to be displaceable in the longitudinal direction thereof; and by means of a securement element 13 the blade is fixed, but shiftable in the longitudinal direction thereof at the working portion 2, whereby the protection cover 10 holds the blade 8 against the working portion 2. The securement element 13 can be provided by a rivet head 14 with screw threading 15 and a cap nut 16 (compare FIG. 8). However, other securement elements 13 of same functionality may be used.

So as to hold the protection cover 10 and to provide the connection, which allows the longitudinal shifting connection of the protection cover 10, with the working portion 2, it may be sufficient that there is provided only one prong 12 and, correspondingly, one longitudinal slot 11. In such an embodiment, the working portion 2 is configured with two edges 17 (compare FIG. 7) which edges ensure guiding in the longitudinal direction of the protection cover 10.

A retracting element 18 is unitarily formed at the protection cover 10, which retracting element 18 is configured in such a manner that it can be pulled back or retracted—using the index finger of the hand that grasps the handgrip portion 1—in such a manner that the protection cover 10 exposes the cutting edge 9 of the blade 8, that is, the blade 8 is effectively uncovered. The retracting element 18 is provided by a turned portion which is unitary with the protection cover 10. A narrowed portion 19 is provided between the handgrip portion 1 and the working portion 2 such that the index finger of the user can readily engage the retracting element 18. The index finger of the user can engage in the free space 20 which is provided in this manner between the narrowed portion 19 and the retracting element 18 so as to retract the protection cover 10 and to thus uncover the cutting edge 9 of the blade 8.

The protection cover 10 reaches the covering position in which it covers the cutting edge 9 by means of spring-like action. Thus, there is provided, for example, a tension spring 21 which is secured, on the one hand, at the retracting element 18 and, on the other hand, at the handgrip portion 1, or at the working portion 2, or at the transition portion 3. The tension spring 21, or a corresponding spring element, is preferably disposed in such a way that it will not interfere with the fingers of the hand that grasps the scraper. Instead of a tension spring 21, a pressure spring can be provided which acts between one of the stiffening ribs 7 and the retracting element 18. When the protection cover 10, or the retracting element 18, are made of a material having suitable spring or biasing properties or characteristics, the free end of the retracting element 18 can engage in force-locking manner which renders a separate tension spring superfluous.

Figure 9:
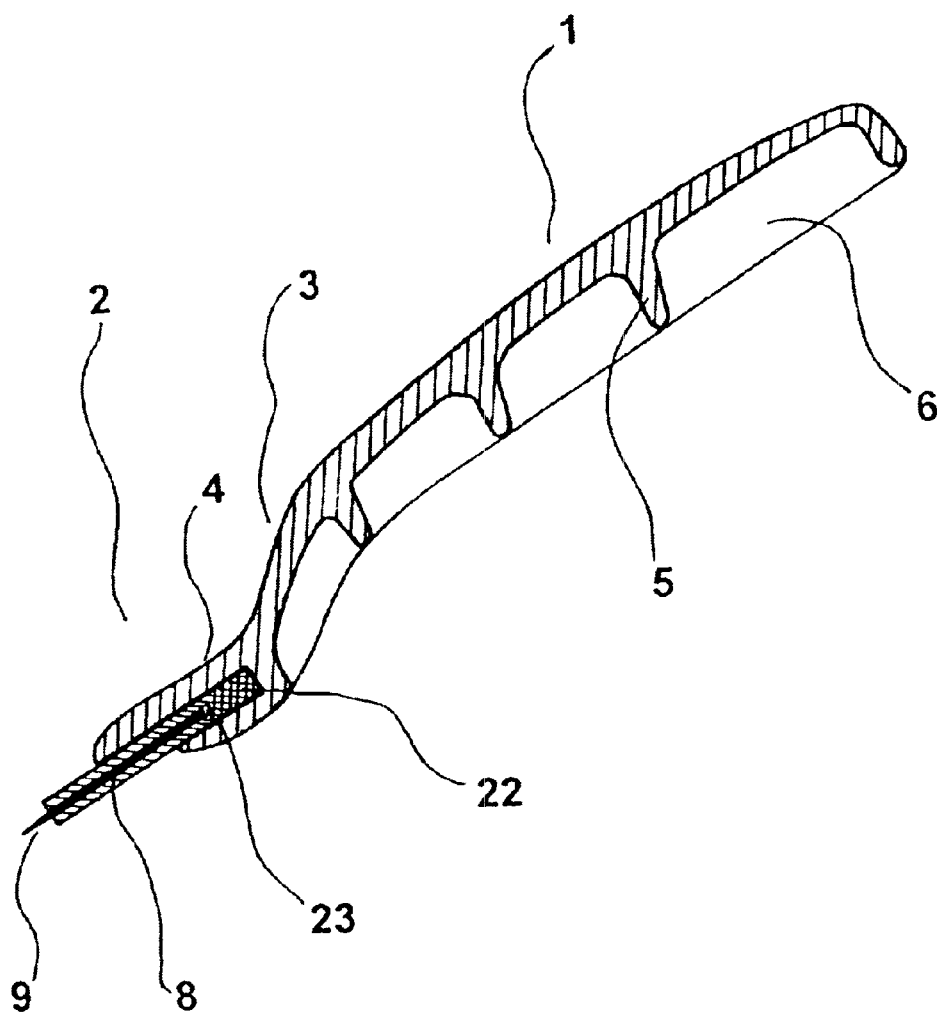
FIG. 9: illustrates a further embodiment of a cleaning scraper in cross-section.

In the embodiment of FIG. 9, the blade 8 is arranged in a receiving body 22 which, in particular, is made of metal. The receiving body 22 is inserted in a pocket 23 that is formed at the working portion 2, preferably replaceable and this receiving body is held by the duroplastic synthetic-plastic material.

Customer-specific lettering can be embossed in a simple manner on the handgrip portion 1, and/or at the working portion 2, during manufacture of the cleaning scraper by means of exchange inserts of the production tool. The cleaning scraper due to being made of a duroplastic synthetic-plastic material can be made in various colors and with various color effects, for example, by addition of metallic flitter and/or other pigments.

So as to store the cleaning scraper in the vicinity of its use, either by hanging or laying or positioning, corresponding holding elements can be provided at the handgrip portion 1 and/or the working portion 2. The pertaining holding element is associated with a holding part which is secured near the place of use, that is, near the glass ceramic cooking surface. The holding part is preferably made from the same duroplastic synthetic-plastic material and colored in the same color as the handgrip portion 1 and the working portion 2 of the cleaning scraper 31.

The manner of connecting the cleaning scraper and the holding part can be provided by a magnetic securement and/or by a notch or groove holding arrangement. In the case of a magnet-type holding arrangement, a permanent magnet piece is integrated in the cleaning scraper, or in the holding part, and a corresponding piece of metal is integrated with the holding part or, respectively, in the cleaning scraper. When a notch or groove connection arrangement is selected between the cleaning scraper and the holding part, pertaining formations and recesses are provided at the cleaning scraper and at the holding part.

In other words, conventional hook and eye connections between the device and a holder may also be used.

So as to have the cleaning scraper at hand in a sensible manner at its place of use, it is also possible to provide the cleaning scraper in its handgrip portion 1 and/or its working portion 2 with holding elements which are adapted to such holding parts as are customarily already present in a kitchen near the place of use, namely, a cooking surface; these are, for example, magnet support bars for knives or, respectively, seasoning containers or rods for hanging thereon cooking spoons and other cooking utensils.

The holding part can be produced with the handgrip portion 1 and the working portion 2 in the same process step, for example, with a multi-cavity tool in unitary configuration, or in a two-part embodiment.

Figure 10:
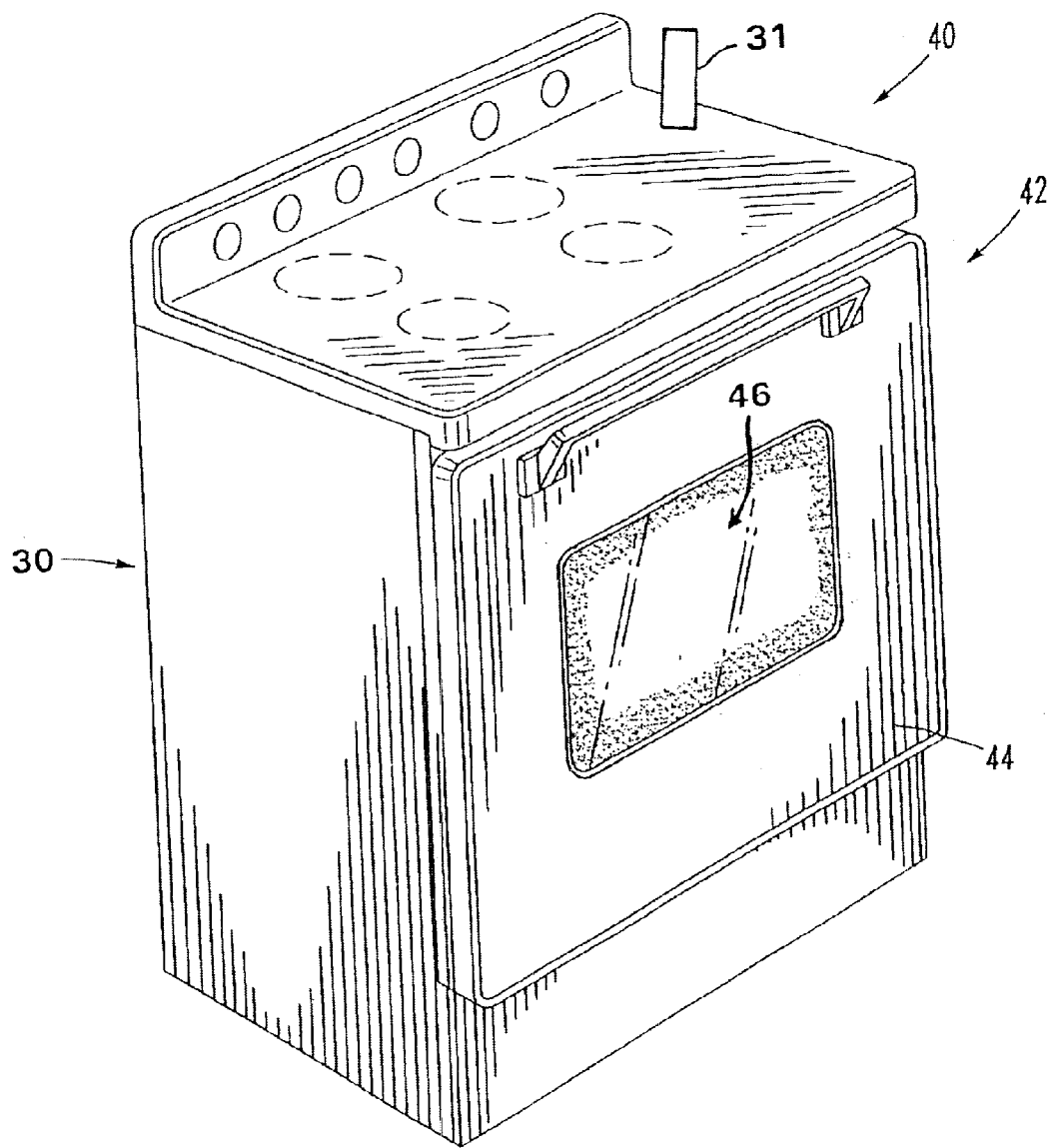
FIG. 10: is a perspective view of a stove with a cooktop and oven and a cleaning scraper shown schematically in use on a cooktop surface.
Figure 11:
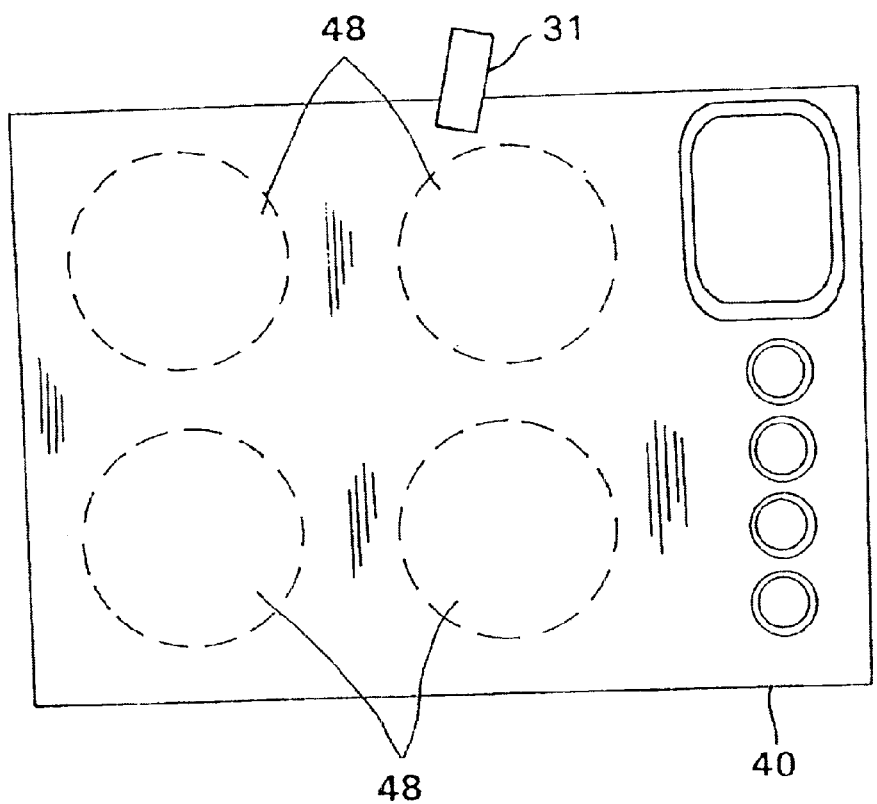
FIG. 11: is a top view of a cooktop or hob with multiple cooking zones and a cleaning scraper shown schematically in use on a cooktop surface.

FIGS. 10 and 11 show the scraper in accordance with one aspect of the invention in use on a cooktop surface.

One feature of the invention resides broadly in the cleaning scraper, which is configured with a handgrip portion and a working portion for receiving thereat a blade and which resists temperatures above one hundred and thirty degrees Celsius, particularly two hundred and forty degrees Celsius and higher, and is withstanding a glass surface or glass-like surface characterized thereby that the handgrip portion 1 and the working portion 2 are formed of a duroplastic synthetic-plastic material.

Another feature of the invention resides broadly in the cleaning scraper characterized thereby that the duroplastic synthetic-plastic material is a melamine resin or an unsaturated polyester resin.

Yet another feature of the invention resides broadly in the cleaning scraper characterized thereby that the synthetic-plastic material is glass fiber reinforced.

Still another feature of the invention resides broadly in the cleaning scraper characterized thereby that the handgrip portion 1 is ergonomically shaped.

A further feature of the invention resides broadly in the cleaning scraper characterized thereby that the handgrip portion 1 and/or the working portion comprise stiffening ribs 5; 7.

Another feature of the invention resides broadly in the cleaning scraper characterized thereby that the working portion 2 forms a thumb-receiving surface 4 for a hand holding the handgrip portion 1.

Yet another feature of the invention resides broadly in the cleaning scraper characterized thereby that in the handgrip portion 1 and/or the working portion 2 holding elements are provided with which the cleaning scraper is capable during nonuse of being held in the ready state for use at a holding part.

Still another feature of the invention resides broadly in the cleaning scraper characterized thereby that the blade 8 can be covered by a protection cover 10 that can be shifted.

A further feature of the invention resides broadly in the cleaning scraper characterized thereby that the protection cover 10 comprises a retracting element 18 at which the protection cover 10 can be retracted with the pointer finger of a hand grasping the handgrip portion 1 in such a way that it uncovers the cutting edge 9 of the blade 8.

Another feature of the invention resides broadly in the cleaning scraper characterized thereby that the protection cover 10 is capable of being spring biased such that it covers the cutting edge 9 of the blade 8 under the biasing action of the spring.

Yet another feature of the invention resides broadly in the cleaning scraper characterized thereby that the protection cover 10 is held in a slidable manner at the working portion 2 by means of a securement element 13.

Still another feature of the invention resides broadly in the cleaning scraper characterized thereby that the blade 8 is seated in a receiving body 22 which is positioned in a pocket 23 of the working portion 2.

Thus, in other words, there is provided in accordance with one aspect of the invention, a cleaning scraper for glass or glass-like surfaces with a handgrip portion 1 and a working portion 2 for receiving a blade 8 which does not to leave residues or damages on contact with a hot surface on the surface and it is to be configured so as to provide a comfortable cleaning even of a hot surface. For this purpose the handgrip portion 1 and the working portion 2 are made of a duroplastic synthetic-plastic material.

The trademarks "CERAN," and "CERA-Quick," are trademarks of SCHOTT GLAS, the assignee hereof. More particularly, "CERAN" is a registered trademark of SCHOTT GLASWERKE, a corporation of the Federal Republic of Germany, having been registered under Registration No. 1,406,635 on Aug. 26, 1986, for the goods and services: component parts of gas and electric stoves, namely stove top panels for cooking.

The components disclosed in the various publications, disclosed or incorporated by reference herein, may be used in the embodiments of the present invention, as well as equivalents thereof.

The appended drawings in their entirety, including all dimensions, proportions and/or shapes in at least one embodiment of the invention, are accurate and are hereby included by reference into this specification.

All, or substantially all, of the components and methods of the various embodiments may be used with at least one embodiment or all of the embodiments, if more than one embodiment is described herein.

All of the patents, patent applications and publications recited herein, and in the Declaration attached hereto, are hereby incorporated by reference as if set forth in their entirety herein.

The corresponding foreign patent publication applications, namely, Federal Republic of Germany Patent Application No. DE 100 26 824.2-15, filed on May 30, 2000, having inventors Bernd SCHULTHEIS, and Monika DE WITZMANN, entitled, "Reinigungsschaber," and DE-OS 100 26 824.2-15 and DE-PS 100 26 824.2-15, as possibly applicable, as well as their published equivalents, and other equivalents or corresponding applications, if any, in corresponding cases in the Federal Republic of Germany and elsewhere, and the references cited in any of the documents cited herein, are hereby incorporated by reference as if set forth in their entirety herein.

The details in the patents, patent applications and publications may be considered to be incorporable, at applicant's option, into the claims during prosecution as further limitations in the claims to patentably distinguish any amended claims from any applied prior art.

The following U.S. Patent Application is to be incorporated by reference as follows: U.S. patent application Ser. No. 09/828,288, entitled, "A COOKING ARRANGEMENT FOR COOKING FOOD SUCH AS A STOVE, SUCH AS A COOKTOP, SUCH AS A COOKING OVEN, WITH AN EASY-TO-CLEAN SURFACE," having attorney docket No. NHL-FMW-01 US(SCT), having inventors Dr. Sabine MELSON, Dr. K. SCHAUPERT, and Dr. Peter NAβ, filed on Apr. 6, 2001, and its corresponding foreign patent publication application, namely, Federal Republic of Germany Patent Application No. DE 100 17 698.4-45, filed on Apr. 8, 2000 having inventors Dr. Sabine MELSON, Dr. K. SCHAUPERT, and Dr. Peter NAβ, entitled, "Reinigungsfreundlicher Glaskeramikkörper," and DE-OS 100 17 698.4-45 and DE-PS 100 17 698.4-45, as possibly applicable, and other equivalents or corresponding applications, if any, in corresponding cases in the Federal Republic of Germany and elsewhere, and the references cited in any of the documents cited herein, are hereby incorporated by reference as if set forth in their entirety herein.

The following U.S. Patent Application is to be incorporated by reference as follows: U.S. patent application Ser. No. 09/829,409, entitled, "FLAT FLOAT GLASS," having attorney docket No. NHL-FMW-02A US(SCT), having inventors Dr. Friedrich SIEBERS, Dr. Peter NAβ, Dr. Gerhard LAUTENSCHLÄGER, and Dr. Otmar BECKER, filed on Apr. 9, 2001, and its corresponding foreign patent publication application, namely, Federal Republic of Germany Patent Application No. DE 100 17 701.8-45, filed on Apr. 8, 2000 having inventors Dr. Friedrich SIEBERS, Dr. Peter NAβ, Dr. Gerhard LAUTENSCHLÄGER, and Dr. Otmar BECKER, entitled, "Gefloatetes Flachglas," and DE-OS 100 17 701.8-45 and DE-PS 100 17 701.8-45, as possibly applicable, and other equivalents or corresponding applications, if any, in corresponding cases in the Federal Republic of Germany and elsewhere, and the references cited in any of the documents cited herein, are hereby incorporated by reference as if set forth in their entirety herein.

Federal Republic of Germany Patent Application Publication DE 41 41 593 A1, and corresponding U.S. Pat. No. 5,056,226, issued to Gringer on Oct. 15, 1991 and entitled, "Tool for Carrying a Scraping or Stripping Blade," and other corresponding applications and patents are hereby incorporated by reference as if set forth in their entirety herein.

The literature information comprising Schröter, W., "Taschenbuch der Chemie [Pocketbook of Chemistry]," 10th edition, 1983, Deutsch-Verlag, Thun, Frankfurt/Main, pages 582 to 590, are hereby incorporated by reference as if set forth in their entirety herein.

Some examples of stoves and ranges which may be utilized or adapted for use in at least one possible embodiment of the present invention may be found in the following U.S. patents: U.S. Pat. No. 5,083,010, having inventors Henry et al., issued on Jan. 21, 1992; U.S. Pat. No. 4,601, 279, having inventor Guerin, issued on Jul. 22, 1986; U.S. Pat. No. 4,493,976, having inventor Wilson, issued on Jan. 15, 1985; U.S. Pat. No. 4,292,501, having inventor Maitenaz, issued on Sep. 29, 1981; U.S. Pat. No. 5,213,091, issued on May 25, 1993; No. D336,210, issued on Jun. 8, 1993; U.S. Pat. No. 5,280,152, issued on Jan. 18, 1994; U.S. Pat. No. 5,290,997, issued on Mar. 1, 1994; U.S. Pat. No. 5,400,765, issued on Mar. 28, 1995; No. D359,345, issued on Jun. 13, 1995; No. D361,015, issued on Aug. 8, 1995; and U.S. Pat. No. 5,464,005, issued on Nov. 7, 1995. The aforementioned patents are hereby incorporated by reference as if set forth in their entirety herein.

Some examples of burners and related components which may be utilized or adapted for use in at least one possible embodiment of the present invention may be found in the following U.S. patents: U.S. Pat. No. 4,348,571, issued to Dills on Sep. 7, 1982 and entitled, "Flux shaping arrangement for induction surface unit"; U.S. Pat. No. 4,758,710, issued to Crossley et al. on Jul. 19, 1988 and entitled, "Heating apparatus"; U.S. Pat. No. 5,186,158, issued to Ferlin on Feb. 16, 1993 and entitled, "Gas burner"; U.S. Pat. No. 5,329,918, issued to Di Bari on Jul. 19, 1994 and entitled, "Combined electric and gas burner"; U.S. Pat. No. 5,400,765, issued to Goldstein et al. on Mar. 28, 1995 and entitled, "Selective emissive cooking stove". The aforementioned patents are hereby incorporated by reference as if set forth in their entirety herein.

Some examples of related components for stoves and ranges which may be utilized or adapted for use in at least one possible embodiment of the present invention may be found in the following U.S. patents: U.S. Pat. No. 5,220,155, issued on Jun. 15, 1993; U.S. Pat. No. 5,245,159, issued on Sep. 14, 1993; U.S. Pat. No. 5,343,020, issued on Aug. 30, 1994; U.S. Pat. No. 5,377,660, issued on Jan. 3, 1995; U.S. Pat. No. 5,380,985, issued on Jan. 10, 1995; and U.S. Pat. No. 5,400,766, issued on Mar. 28, 1995. The aforementioned patents are hereby incorporated by reference as if set forth in their entirety herein.

Some examples of cooking hobs and cooktops which may be utilized or adapted for use in at least one possible embodiment of the present invention may be found in the following U.S. patents: U.S. Pat. No. 5,406,932, issued on Apr. 18, 1995; U.S. Pat. No. 5,422,460, issued on Jun. 6, 1995; U.S. Pat. No. 5,424,512, issued on Jun. 13, 1995; U.S. Pat. No. 5,425,353, issued on Jun. 20, 1995; U.S. Pat. No. 5,429,114, issued on Jul. 4, 1995; and U.S. Pat. No. 5,448,036, issued on Sep. 5, 1995. The aforementioned patents are hereby incorporated by reference as if set forth in their entirety herein.

The term duroplastic material or materials is to indicate synthetic-plastic materials with the characteristic that they decompose under heat without prior softening and they are insoluble. Examples of duroplastic materials that may be used in aspects of our invention include, for example, unsaturated polyester (UP) resins or, for example, melamine (MF) resins.

Such unsaturated polyester (UP) materials are available from the firm DUROFORM GmbH, Kieselstr., 56357 Miehlen, Federal Republic of Germany, under the designation HUP 17, HUP 19, HUP 21; and from POLYPLY COMPOSITES INC., 1540 Marion St., Grand Haven, Mich., under the designation SM-530. Such melamine resins (MF) are available from BAKELITE GmbH, Gennaer Str. 2, 58642 Iserlohn, Federal Republic of Germany, under the designation MF 2500; and from AMERICAN CYANAMID CORP., Wayne, N.J. 07470 under the designation Cymel.

Some examples of synthetic-plastic resins which may be utilized or adapted for use in at least one possible embodiment of the present invention may be found in the following U.S. patents: U.S. Pat. No. 4,820,575, issued to Kölzer on Apr. 11, 1989 and entitled, "Reinforcing material"; U.S. Pat. No. 5,155,147, issued to Dietz et al. on Oct. 13, 1992 and entitled, "Method of making a pressible mixture of lignocellulose-containing fibers and a thermoplastic material having stronger bonding between the fibers and the thermoplastic material"; U.S. Pat. No. 5,158,732, issued to Sanitate et al. on Oct. 27, 1992 and entitled, "Method of tempering work pieces of duroplastic plastic"; U.S. Pat. No. 5,173,560, issued to Gras et al. on Dec. 22, 1992 and entitled, "Cold-curing solvent free duroplastic polyurethane-polyurea compounds"; U.S. Pat. No. 5,230,906, issued to Mueller on Jul. 27, 1993 and entitled, "Method of and apparatus for manufacturing fiber-reinforced plastics articles"; and U.S. Pat. No. 5,977,214, issued to Knorr et al. on Nov. 2, 1999 and entitled, "Process for producing duroplastic molding compounds". The aforementioned patents are hereby incorporated by reference as if set forth in their entirety herein.

Some examples of resin molding methods and compositions which may be utilized or adapted for use in at least one possible embodiment of the present invention may be found in the following U.S. and foreign patents and application publications, respectively, U.S. Pat. No. 3,967,004 issued to Oda et al. on Jun. 29, 1976 and entitled, "Method for the production of fiber-reinforced resin compounds"; U.S. Pat. No. 3,981,954 issued to Algieri et al. on Sep. 21, 1976 and entitled, "Method of melamine glazing of polyester substrates"; U.S. Pat. No. 4,188,316 issued to Sawada on Feb. 12, 1980 and entitled, "Process for producing shaped articles with patterns"; U.S. Pat. No. 4,211,686 issued to Nishikawa et al. on Jul. 8, 1980 and entitled, "Unsaturated polyester resin composition for use in pressure molding"; U.S. Pat. No. 4,290,938 issued to Miyake et al. on Sep. 22, 1981 and entitled, "Thermosetting injection molding compound"; U.S. Pat. No. 4,352,897 issued to Ogata et al. on Oct. 5, 1982 and entitled, "Resin molded stators"; U.S. Pat. No. 4,487,862 issued to Maruya on Dec. 11, 1984 and entitled, "Thermosetting resin composition for injection molding and article formed by using the composition"; German Patent Publication No. DOS 37 24 080 A1 published on Feb. 2, 1989 and entitled, "Verfahren zum Herstellen eines wärmebeständigen Kunststoffteils [Method of making a heat resistant synthetic-plastic part]"; German Patent No. 41 13 148 C2 issued on Jun. 14, 1995 and entitled, "Vorrichtung zum Herstellen laminierter Formteile aus thermoplastischem Kunstoff-Material {Apparatus for making laminated parts of thermoplastic synthetic-plastic material]"; U.S. Pat. No. 5,447,676 issued to Fukuda et al. on Sep. 5, 1995 and entitled "Low-pressure and low-temperature moldable composition and shaped article therefrom"; Canadian Published Patent Application No. 2,207,985, published on Jun. 27, 1996 and entitled "Process for manufacturing components made of fiber-reinforced thermoplastic materials and components manufactured by this process"; U.S. Pat. No. 5,556,666 issued to Marciandi et al. on Sep. 17, 1996 and entitled "Process for preparing color contrasts on articles obtained by molding from polymerizable compositions"; German Patent Publication DOS 196 14 934 A1 published on Oct. 10, 1997 and entitled "Zur Herstellung lackierbarer Teile geeignete glasmattenverstärkte Thermoplasten und daraus hergestellte Teile [Glas-mat reinforced thermosplasts for the making of parts that can be lacquered and parts made therefrom]"; and U.S. Pat. No. 5,972,272 issued to Nagase et al. on Oct. 26, 1999 and entitled "Unsaturated polyester resin composition and process for molding the composition," all of the aforementioned patents and patent publications, respectively, are hereby incorporated by reference as if set forth in their entirety herein.

Some examples of ceramic plates or hot plates which may be utilized or adapted for use in at least one possible embodiment of the present invention may be found in the following U.S. patents: U.S. Pat. No. 3,596,650, issued on Aug. 3, 1971; U.S. Pat. No. 3,870,861, issued on Mar. 11, 1975; U.S. Pat. No. 4,414,465, issued on Nov. 8, 1983; U.S. Pat. No. 4,634,841, issued on Jan. 6, 1987; and U.S. Pat. No. 5,397,873, issued on Mar. 14, 1995. The aforementioned patents are hereby incorporated by reference as if set forth in their entirety herein.

Some examples of ceramic materials which may be utilized or adapted for use in at least one possible embodiment of the present invention may be found in the following U.S. patents: U.S. Pat. No. 5,385,873, issued on Jan. 31, 1995; U.S. Pat. No. 5,407,740 issued on Apr. 18, 1995; U.S.

Pat. No. 5,420,399, issued on May 30, 1995; U.S. Pat. No. 5,422,319, issued on Jun. 6, 1995; U.S. Pat. No. 5,449,649, issued on Sep. 12, 1995; U.S. Pat. No. 5,476,684, issued on Dec. 19, 1995; and U.S. Pat. No. 5,691,261, issued on Nov. 25, 1997. The aforementioned patents are hereby incorporated by reference as if set forth in their entirety herein.

Some examples of features related to scrapers that may be utilized or adapted for use in at least one possible embodiment of the present invention of the present invention may be found in the following U.S. patents: U.S. Pat. No. 4,558,517, issued to Gringer on Dec. 17, 1985 and entitled "Scraper hand tool"; U.S. Pat. No. 4,575,936, issued to Gringer on Mar. 18, 1986 and entitled, "Blade retaining tool head"; U.S. Pat. No. 4,779,301, issued to Millette on Oct. 25, 1988 and entitled "Scraper"; U.S. Pat. No. 4,955,138, issued to Henke et al. on Sep. 11, 1990 and entitled "Utility blade scraper"; U.S. Pat. No. 5,319,853, issued to Schmidt on Jun. 14, 1994 and entitled "Scraper"; No. RE 34,979, issued to Gringer on Jun. 27, 1995 and entitled "Tool for carrying a scraping or stripping blade"; U.S. Pat. No. 5,433,004, issued to Thompson et al. on Jul. 18, 1995 and entitled "Single edge blade scraper"; U.S. Pat. No. 5,435,064, issued to Brookfield on Jul. 25, 1995 and entitled "Planar surface scraper"; U.S. Pat. No. 5,528,832, issued to Schmidt on Jun. 25, 1996 and entitled "Scraper"; and U.S. Pat. No. 5,996,231, issued to Roche et al. on Dec. 7, 1999 and entitled "Scraping tool with replaceable blade and controlled quick-release clamps". The aforementioned patents are hereby incorporated by reference as if set forth in their entirety herein.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims. In the claims, means-plus-function clauses are intended to cover the structures described herein as performing the recited function and not only structural equivalents but also equivalent structures.

The invention as described herein above in the context of the preferred embodiments is not to be taken as limited to all of the provided details thereof, since modifications and variations thereof may be made without departing from the spirit and scope of the invention.

What is claimed is:

1. An arrangement for removing residue from cooking spills from a heated or cold cooking surface, said arrangement comprising:
    a scraping device being configured to minimize damage to a cooking surface;
    said scraping device being configured with sufficient stiffness and rigidity to maintain its structural shape upon being pressed to a cooking surface;
    said scraping device being configured to withstand use on a heated cooking surface having a temperature greater than or equal to two hundred and forty degrees Celsius;
    said scraping device comprising:
        a blade;
        a body;
        said body having an ergonomically shaped structural shape and being configured to accept a hand of a user;
        said body having a longitudinal axis;
        said body comprising a first end and a second end;
        said first end of said body comprising a handgrip portion being configured to conform to a hand of a user of said scraping device;
        said second end of said body comprising a blade holder being configured to hold said blade;
        said blade being removably secured at said blade holder;
        said blade holder comprising a device to operatively secure
        said blade at said blade holder;
        said blade comprising a scraping edge to engage with a cooking surface from which residue from cooking spills is to be removed with said scraping device;
        said scraping edge comprising an acute angle configured to minimize damage to a cooking surface;
    at least said blade holder comprises a protection cover;
    said protection cover being configured to be moveably disposable at said blade holder so as to be moveable between a position to uncover said scraping edge and a position to cover said scraping edge of said blade;
    said protection cover comprising a retracting element with which said protection cover can be retracted with the pointer finger of a hand grasping said handgrip portion to uncover said scraping edge of said blade;
    said blade holder and said handgrip portion comprising a duroplastic synthetic-plastic material having a thermal conductivity being sufficiently low to minimize heat conduction between said blade and said blade holder, and also having a thermal conductivity to minimize heat being conducted along said handgrip portion upon said blade making contact with a hot cooking surface;
    said synthetic-plastic material being configured to withstand temperatures greater than or equal to two hundred and forty degrees Celsius;
    said synthetic-plastic material comprising one of: a melamine resin, and an unsaturated polyester resin;
    said synthetic-plastic material being a glass fiber reinforced synthetic-plastic material;
    one of said handgrip portion and said blade holder comprising stiffening ribs; said blade holder being configured with a thumb-receiving surface for the thumb of a hand of a user holding said handgrip portion;
    one of said handgrip portion and said blade holder comprising at least one holding element being configured to hold said arrangement during non-use in its ready state at a holding part;
    said blade holder comprising a receiving body being configured to receive and hold said blade;
    said blade holder comprising a pocket formation being configured to hold said receiving body;
    said protection cover being spring biased to cover said scraping edge of said blade; and
    a securement element to releasably secure said protection cover,
    wherein said cooking surface is selected from the group consisting of: (a.) a cooking surface of a smooth-top kitchen ceramic cooktop; (b.) a cooking surface of a smooth-top kitchen glass ceramic cooktop, (c.) a cooking surface of a stove having a ceramic cooktop cooking surface, and (d.) a cooking surface of a stove having a glass ceramic cooktop cooking surface.

2. An arrangement for removing residue from cooking spills from a heated or cold cooking surface, said arrangement comprising:
    a scraping device being configured to minimize damage to a cooking surface;
    said scraping device being configured with sufficient stiffness and rigidity to maintain its structural shape upon being pressed to a cooking surface;

said scraping device being configured to withstand use on a heated cooking surface having a temperature greater than or equal to one hundred and thirty degrees Celsius;
said scraping device comprising:
    a blade;
    a body;
    said body having an ergonomically shaped structural shape and being configured to accept a hand of a user;
    said body having a longitudinal axis;
    said body comprising a first end and a second end;
    said first end of said body comprising a handgrip portion being configured to conform to a hand of a user of said scraping device;
    said second end of said body comprising a blade holder being configured to hold said blade;
    said blade being removably secured at said blade holder;
    said blade holder comprising a device to operatively secure said blade at said blade holder;
    said blade comprising a scraping edge to engage with a cooking surface from which residue from cooking spills is to be removed with said scraping device;
    said scraping edge comprising an acute angle configured to minimize damage to a cooking surface;
    at least said blade holder comprises a protection cover;
    said protection cover being configured to be moveably disposable at said blade holder so as to be moveable between a position to uncover said scraping edge and a position to cover said scraping edge of said blade;
    said protection cover comprising a retracting element with which said protection cover can be retracted with the pointer finger of a hand grasping said handgrip portion to uncover said scraping edge of said blade;
    said blade holder and said handgrip portion comprising a duroplastic synthetic-plastic material having a thermal conductivity being sufficiently low to minimize heat conduction between said blade and said blade holder, and also having a thermal conductivity to minimize heat being conducted along said handgrip portion upon said blade making contact with a hot cooking surface;
    said synthetic-plastic material being configured to withstand temperatures greater than or equal to one hundred and thirty degrees Celsius;
    said synthetic-plastic material comprising one of: a melamine resin, and an unsaturated polyester resin;
    said synthetic-plastic material being a glass fiber reinforced synthetic-plastic material;
    one of said handgrip portion and said blade holder comprising stiffening ribs;
    said blade holder being configured with a thumb-receiving surface for the thumb of a hand of a user holding said handgrip portion;
    one of said handgrip portion and said blade holder comprising at least one holding element being configured to hold said arrangement during non-use in its ready state at a holding part;
    said blade holder comprising a receiving body being configured to receive and hold said blade;
    said blade holder comprising a pocket formation being configured to hold said receiving body; and
    said protection cover being spring biased to cover said scraping edge of said blade,
wherein said cooking surface is selected from the group consisting of: (a.) a cooking surface of a smooth-top kitchen ceramic cooktop; (b.) a cooking surface of a smooth-top kitchen glass ceramic cooktop, (c.) a cooking surface of a stove having a ceramic cooktop cooking surface, and (d.) a cooking surface of a stove having a glass ceramic cooktop cooking surface.

3. The arrangement according to claim 2, wherein said synthetic-plastic material being configured to withstand temperatures greater than or equal to two hundred and forty degrees Celsius.

4. An arrangement for removing residue from cooking spills from a heated or cold cooking surface, said arrangement comprising:
    a scraping device being configured to minimize damage to a cooking surface;
    said scraping device being configured with sufficient stiffness and rigidity to maintain its structural shape upon being pressed to a cooking surface;
    said scraping device being configured to withstand use on a heated cooking surface;
    said scraping device comprising:
        a blade;
        a body;
        said body having an ergonomically shaped structural shape and being configured to accept a hand of a user;
        said body having a longitudinal axis;
        said body comprising a first end and a second end;
        said first end of said body comprising a handgrip portion being configured to conform to a hand of a user of said scraping device;
        said second end of said body comprising a blade holder being configured to hold said blade;
        said blade being removably secured at said blade holder;
        said blade holder comprising a device to operatively secure said blade at said blade holder;
        said blade comprising a scraping edge to engage with a cooking surface from which residue from cooking spills is to be removed with said scraping device;
        said scraping edge comprising an acute angle configured to minimize damage to a cooking surface;
        at least said blade holder comprises a protection cover;
        said protection cover being configured to be moveably disposable at said blade holder so as to be moveable between a position to uncover said scraping edge and a position to cover said scraping edge of said blade;
        said protection cover comprising a retracting element with which said protection cover can be retracted with the pointer finger of a hand grasping said handgrip portion to uncover said scraping edge of said blade;
        said blade holder and said handgrip portion comprising a duroplastic synthetic-plastic material having a thermal conductivity being sufficiently low to minimize heat conduction between said blade and said blade holder, and also having a thermal conductivity to minimize heat being conducted along said handgrip portion upon said blade making contact with a hot cooking surface;
        said synthetic-plastic material comprising one of: a melamine resin, and an unsaturated polyester resin;
        said synthetic-plastic material being a glass fiber reinforced synthetic-plastic material;
        one of said handgrip portion and said blade holder comprising stiffening ribs;
        said blade holder being configured with a thumb-receiving surface for the thumb of a hand of a user holding said handgrip portion; and one of said handgrip portion and said blade holder comprising at least one holding element being configured to hold said arrangement during non-use in its ready state at a holding part, wherein said cooking surface is selected from the group consisting of: (a.) a cooking surface of a smooth-top kitchen ceramic cooktop; (b.) a cooking surface of a smooth-top kitchen glass ceramic cooktop, (c.) a cooking surface of a stove having a ceramic cooktop cooking surface, and (d.) a cooking surface of a stove having a glass ceramic cooktop cooking surface.

5. The arrangement according to claim 4, wherein said synthetic-plastic material being configured to withstand temperatures greater than or equal to one hundred and thirty degrees Celsius.

6. The arrangement according to claim 5, wherein said synthetic-plastic material being configured to withstand temperatures greater than or equal to two hundred and forty degrees Celsius.

* * * * *